United States Patent [19]

Kamo

[11] Patent Number: 4,898,343

[45] Date of Patent: Feb. 6, 1990

[54] THRUST-DEFLECTING VANE DEVICE OF V/STOL AIRCRAFT

[75] Inventor: Keisuke Kamo, Tokyo, Japan

[73] Assignee: Fuji Jukogyo Kabushiki Kaisha, Tokyo, Japan

[21] Appl. No.: 286,806

[22] Filed: Dec. 20, 1988

[30] Foreign Application Priority Data

Dec. 25, 1987 [JP] Japan .................................. 62-328887

[51] Int. Cl.$^4$ ............................................. B64C 29/00
[52] U.S. Cl. ................................... 244/12.4; 244/12.5; 244/52; 244/56
[58] Field of Search ............ 244/3.22, 3.24, 3.26–3.29, 244/12.4, 12.5, 23 D, 23 A, 56, 52, 87, 88

[56] References Cited

U.S. PATENT DOCUMENTS

| | | |
|---|---|---|
| 3,515,361 | 6/1970 | Blackburn ............................ 244/52 |
| 3,730,460 | 5/1973 | Medever ............................... 244/52 |
| 4,116,405 | 9/1978 | Bacchi et al. ....................... 244/12.4 |
| 4,203,569 | 5/1980 | Marks .................................. 244/3.28 |
| 4,296,896 | 10/1981 | Kiess et al. ......................... 244/12.4 |
| 4,482,109 | 11/1984 | DuPont ................................ 244/52 |
| 4,538,779 | 9/1985 | Goldstein ............................ 244/87 |
| 4,726,545 | 2/1988 | Kiess ................................... 244/52 |

FOREIGN PATENT DOCUMENTS

| | | |
|---|---|---|
| 26038 | 7/1980 | Japan . |
| 134396 | 8/1982 | Japan . |
| 141753 | 8/1984 | Japan . |
| 237147 | 1/1985 | Japan . |

Primary Examiner—Galen L. Barefoot
Attorney, Agent, or Firm—Beveridge, DeGrandi & Weilacher

[57] ABSTRACT

Two tail control surfaces operable doubly as thrust-deflecting vanes are rotatably supported on respective lateral sides of a jet engine of a V/STOL aircraft. Each tail surface can be actuated to rotate about an axis parallel to the engine axis and also to rotate about an axis perpendicular to the engine axis. The tail surfaces can be placed in outer positions on respective lateral sides of the engine for high-speed flight to function as stabilizer surfaces and to be placed within the engine exhaust gas stream and, moreover, to be placed in an inclined state relative thereto thereby to deflect the stream downward for slow-speed or hovering flight.

5 Claims, 2 Drawing Sheets

THRUST-DEFLECTING VANE DEVICE OF V/STOL AIRCRAFT

BACKGROUND OF THE INVENTION

This invention relates generally to vertical/short take-off and landing (hereinafter referred to as V/STOL) aircraft and particularly to surfaces to operate in slipstreams of such aircraft. More particularly, the invention relates to thrust-deflecting vanes operable doubly as tail surfaces of V/STOL aircraft. Still more specifically, the invention relates to such vanes which are operable, at the time of high-speed flight, to project as tail surfaces outward from the aircraft fuselage and, at the time of low-speed flight, to be inserted into the exhaust gas slipstream from the jet engine to deflect the same.

In general, when a V/STOL aircraft is flying at a low speed or is hovering, its ordinary control surfaces which depend on the force of flowing air lose their effectiveness, and the aircraft tends to become aerodynamically unstable. Accordingly, control of the attitude of the airframe is carried out by means of reaction jets or thrust-deflecting vanes. (Reference: Japanese Patent Application Laid-Open Publn. No. 134396/1982, Patent Publication No. 26038/1980.)

In the method of controlling the attitude of the airframe by means of reaction jets, gas or air is ejected from nozzles mounted on the airframe nose, tail, and wing tips, and the attitude of the aircraft is controlled by adjusting the thrust force, direction and ejection time of the jets thus ejected.

In the method of attitude control by means of thrust-deflecting vanes, the flow of the exhaust gas of each jet engine is deflected by one or more vanes provided in the exhaust gas flow, and the attitude of the aircraft is controlled by adjusting the moment thus obtained. (Reference: Japanese Patent Application Laid-Open Publn. No. 141753/1984, Patent Application Laid-Open Publn. No. 237147/1985.)

However, by the reaction jet method, while control of the attitude of the aircraft is possible without greatly altering the profile of the entire airframe and without causing an increase in the drag of the aircraft at the time of high-speed flight, the control power is insufficient since the bleeding capacity is inadequate. By the thrust-deflecting vane method, the control power is large, and the control force can be varied linearly, control being relatively easy. On the other hand, a large number of moving parts are required, and the mechanism becomes complicated and heavy. Furthermore, since the vanes are in the exhaust gas stream, the drag of the aircraft flying at high speed is increased.

SUMMARY OF THE INVENTION

Accordingly it is an object of this invention to provide tail control surfaces operable doubly as thrustdeflecting vanes of a V/STOL aircraft, in which: the above described problems relating to attitude control of V/STOL aircraft in the prior art have been overcome; increase in drag due to thrust-deflecting vanes during high-speed flight is prevented; and power for controlling the aircraft attitude at low flight speed is positively secured by inserting the tail surfaces into the exhaust gas stream from the jet engine.

According to this invention there is provided, in a vertical/short take-off and landing (V/STOL) aircraft having an airframe and a jet engine mounted thereon and discharging aftward an exhaust gas stream, the combination therewith of tail surfaces provided at an aft part of the airframe and a tail surface deflecting device intercoupling the tail surfaces and the airframe and being operable to move the tail surfaces selectively between first positions on the outer lateral sides of the airframe and second positions in the exhaust gas stream, whereby, at the time of high-speed flight, the tail surface deflecting device is operated to extend the tail surfaces in the first positions and, at the time of low-speed flight, to retract the tail surfaces into the second positions and, at the same time, to force the tail surfaces to assume an inclined attitude relative to the direction of the exhaust gas stream thereby to deflect the exhaust gas stream downward, the tail surfaces thus being operable doubly as thrust-deflecting vanes.

The nature, utility, and further features of this invention will come understood from the following detailed description with respect to preferred embodiments of the invention when read in conjunction with the accompanying drawings, briefly described below.

DETAILED DESCRIPTION OF THE INVENTION

Figure 1:
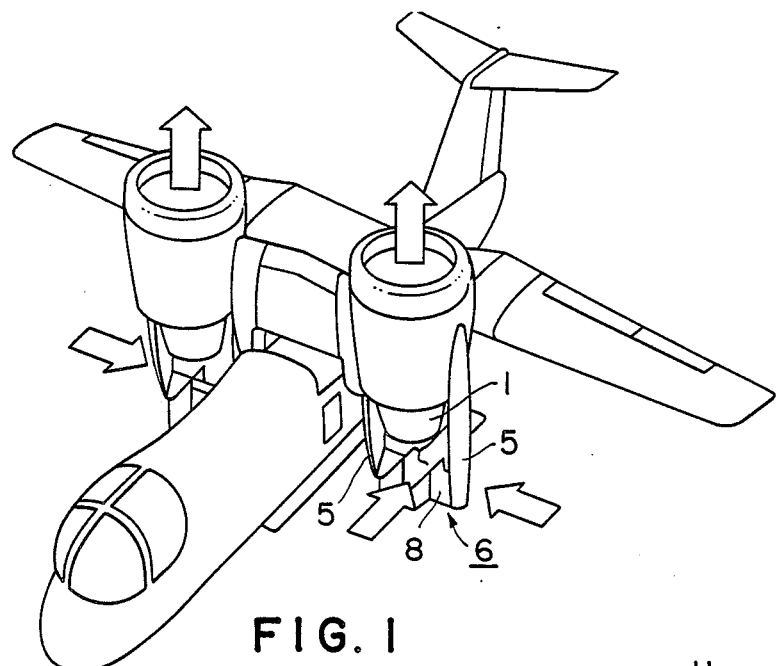
FIG. 1 is a perspective view showing an example of a V/STOL aircraft in which the tail surfaces/thrust-deflecting vanes according to this invention can be applied.
Figure 2:
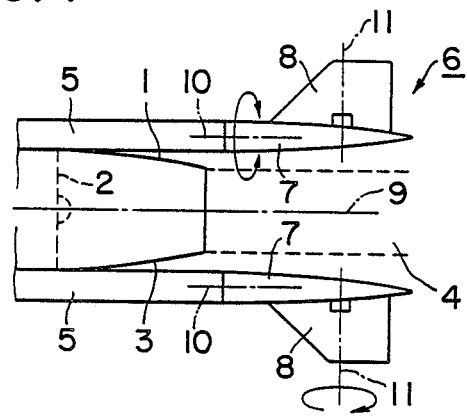
FIG. 2 is a plan view of one example of the tail surfaces/thrust-deflecting vanes according to this invention of a V/STOL aircraft, shown in the state of high-speed flight.

Referring first to FIG. 2, a jet engine 2 is mounted and enclosed within an engine housing 1. The passage on the outlet side of this jet engine 2 is in the form of a nozzle 3 having a cross section which decreases progressively toward the rear end. Through this nozzle 3, the exhaust gas flow 4 from the engine is ejected.

On opposite (starboard and port) sides of the housing 1, a pair of boom-like brackets 5, 5 are fixedly supported relative to the side faces of the housing and extend aft substantially parallelly. At the rear end of each bracket 5, a tail control surface 8 is mounted by way of a vane or runner boss 7 constituting a tail surface deflecting device 6. Each tail surface 8 is so mounted that it can rotate about an axis 10 of rotation parallel to the engine turbine axis 9 and also about a swinging or deflecting axis 11 perpendicular to the axis 10, being capable of rotating about either one axis (10 or 11) at one time or simultaneously about both axes 10 and 11. More specifically, the runner boss 7 can rotate about the axis 10 relative to the bracket 5, and at the same time the tail surface 8 can rotate about the deflecting axis 11 on the runner boss 7. The actuator means for actuating the runner boss 7 and the tail surface in rotation are not shown in the drawings, but various devices comprising combinations of servomotors and gear mechanisms can be used.

Figure 3:
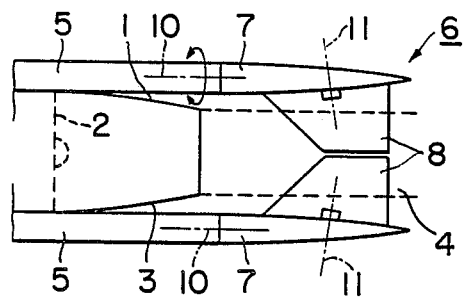
FIG. 3 is a plan view of the same tail surfaces/thrust-deflecting vanes shown in the state for low-speed flight.

The control device of the above described construction is operated in the following manner. During high-speed flight, the tail surfaces 8, 8 are used in outwardly extended state from the airframe as shown in FIG. 2. On the other hand, during low-speed flight, the tail surfaces 8, 8 are used in retracted state in the exhuast gas stream 4 as shown in FIG. 3. When it is necessary to secure stability of the aircraft, the tail surfaces 8 only are rotated about the deflecting axes 11 to set the airfoil surfaces of the tail surfaces 8 at a specific angle relative to the exhaust gas stream 4 and thereby to deflect this exhaust gas flow downward.

Figure 4:
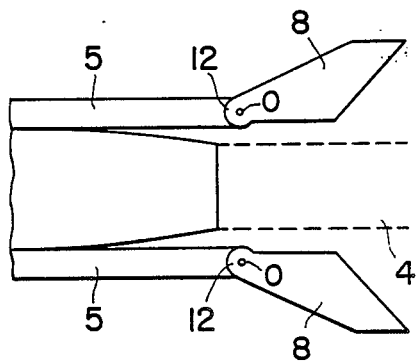
FIG. 4 is a plan view of another example of the tail surfaces/thrust-deflecting vanes according to the invention, shown in their state for high-speed flight.
Figure 5:
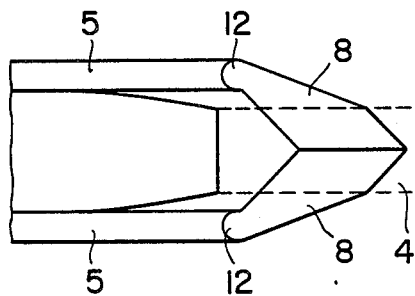
FIG. 5 is a plan view of the same in their state of low-speed flight.

According to another embodiment of this invention as illustrated in a simple manner in FIGS. 4 and 5, the tail surface deflecting device 6 is constituted by a universal joint 12. The tail surfaces 8, 8 are capable of rotating about centers O within a horizontal plane and, at the same time, of swinging in the up-and-down flapping directions. FIG. 4 shows the state wherein the tail surfaces are extended laterally outward from the airframe, while FIG. 5 shows the state wherein the tail surfaces 8, 8 have been swung inward until their edges are in contact, and moreover a large portion of the surfaces 8 are in the exhaust gas stream 4.

Figure 6:
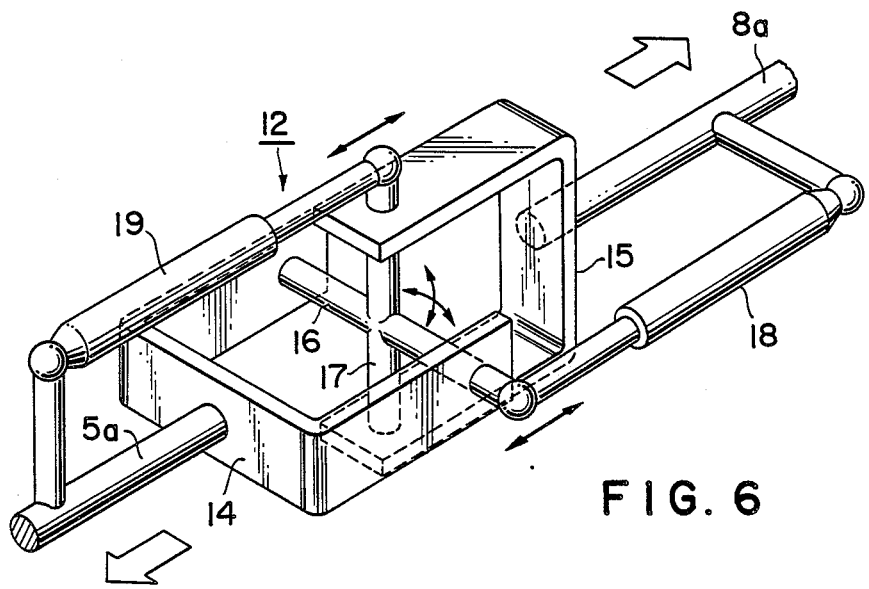
FIG. 6 is a perspective view showing an example of a universal joint operable as a tail surface deflecting device according to the invention.

A specific example of the universal joint 12, as shown in FIG. 6, is essentially a mechanism commonly known as a Hooke's joint or a Cardan joint and comprises a first clevis yoke 14 fixed to a structural part 5a of the bracket 5 on the airframe side, a second clevis yoke 15 fixed to a root part 8a of the tail surface 8 and orientated at 90 degrees of angle relative to the first yoke 14, and a cross-shaped spider consisting of first and second rods 16 and 17, the ends of the first rod 16 being pivotally supported respectively on the tine arms of the first yoke 14 and the ends of the second rod 17 being pivotally supported respectively on the tine arms of the second yoke 15. The first and second yokes 14 and 15 are thus coupled by the spider 16, 17 to be universally rotatable about the axis of the first rod 16 and about the axis of the second rod 17, respectively.

Furthermore, a horizontal actuator 18 is connected between one end of the first rod 16 and the root part 8a of the tail surface 8. A vertical actuator 19 is connected between one end of the second rod 17 and the structural part 5a of the bracket 5.

Thus, in the operation of the above described universal joint mechanism, by activating the horizontal actuator 18, the second yoke 15 is rotated in swinging movement within a horizontal plane about the second rod 17 as a pivotal axis. Therefore, the tail surface 8, which is unitarily connected to this second yoke 15 can be swung within a horizontal plane between the two positions indicated in FIGS. 4 and 5. Furthermore, by activating the vertical actuator 19 when the tail surfaces 8, 8 are in their position within the exhaust gas stream as shown in FIG. 5, the second yoke 15 is caused to swing about the first rod 16, whereby the tail surfaces 8, 8 also swing up or down within the exhaust gas stream.

As described above, this invention provides a tail surface deflecting device by which tail surfaces can be moved in a horizontal plane and in a vertical plane, whereby, at the time of high-speed flight, the tail surfaces can be extended outward from the air frame and can be used to control the stability of the aircarft by varying the angle of attack of the tail surfaces. During this operation, increase in drag due to deflecting vanes is eliminated, and weight reduction is achieved. At the time of low-speed flight or hovering flight, the tail surfaces can be positioned within the exhaust gas stream to deflect the exhaust gas stream downward and thereby to control the attitude of the aircraft.

What we claim is:

1. A thrust-deflecting vane device for a vertical/short take-off and landing (V/STOL) aircraft having an airframe and a jet engine which discharges an exhaust gas stream, comprising:

tail surfaces provided at an aft part of said airframe; and a tail surface deflecting device intercoupling said tail surfaces and said airframe and being operable to move said tail surfaces selectively between first positions on the outer lateral sides of said airframe and second positions in said exhaust gas stream, said tail surface deflecting device including a universal joint mechanism with a first yoke having a root part secured to the airframe side, a second yoke having a root art secured to the tail surface side, first and second rods rigidly fixed perpendicularly to each other to form a cross-shaped spider, the ends of said first rod being pivotally connected to respective tines of said first yoke, the ends of said second rod being pivotally connected to respective tines of said second yoke, a horizontal actuator connected between one end of said first rod and the tail surface side to controllably vary the distance therebetween, and a vertical actuator connected between one end of said second rod and the airframe side to controllably vary the distance therebetween.

2. A thrust-deflecting vane device for a vertical/short take-off and landing (V/STOL) aircraft having an airframe and a jet engine which discharges an exhaust gas stream, comprising:

tail surfaces being provided at an aft part of said airframe; and a tail surface deflecting device intercoupling said tail surfaces with said airframe and being operable to move said tail surfaces selectively between first positions on the outer lateral sides of said airframe and second positions in said exhaust gas stream, said tail surface deflecting device including brackets extending longitudinally along and being fixed to a housing of said jet engine, vane bosses being mounted on said respective brackets and adapted to rotate about respective longitudinal axes, and said tail surfaces being mounted on said respective vane bosses and adapted to rotate about respective lateral axes.

3. A thrust-deflecting vane device of a vertical/short take-off and landing (V/STOL) aircraft having an airframe and a jet engine which discharges an exhaust gas stream, comprising:

tail surfaces being provided at an aft part of said airframe; and a tail surface deflecting device intercoupling said tail surfaces with said airframe and being operable to move said tail surfaces selectively between first positions on the outer lateral sides of said airframe and second positions in said exhaust gas stream, said tail surface deflecting device including a universal joint mechanism.

4. A thrust-deflecting vane device for a vertical/short take-off and landing aircraft having a jet engine which discharges a rearward exhaust gas stream, comprising:
 a pair of boom-like brackets fixedly supported along respective side faces of a housing of said jet engine;
 runner boss means, rotatably mounted on said boom-like brackets about a longitudinal axis, for providing a high-speed flight position and a low-speed flight position; and
 tail control surface means, rotatably mounted on said runner boss means about a lateral axis, for deflecting said exhaust gas stream and controlling attitude of said aircraft.

5. A thrust-deflecting vane device for a vertical/short take-off and landing aircraft having an airframe and a jet engine which discharges a rearward exhaust gas stream, comprising:
 tail surfaces provided as an aft part of said airframe; and
 a universal joint mechanism intercoupling said tail surfaces and said airframe and being operable to move said tail surfaces selectively between first positions on the outer lateral sides of said airframe and second positions in said exhaust gas stream, said universal joint mechanism including a first yoke having a root part secured to the airframe side, a second yoke having a root part secured to the tail surface side, first and second rods rigidly fixed perpendicularly to each other to form a cross-shaped spider, the ends of said first rod being pivotally connected to respective tines of said first yoke, the ends of said second rod being pivotally connected to respective tines of said second yoke, a horizontal actuator connected between one end of said first rod and the tail surface side to controllably vary the distance therebetween, and a vertical actuator connected between one end of said second rod and the airframe side to controllably vary the distance therebetween.

* * * * *